United States Patent
Imazu et al.

(10) Patent No.: US 7,192,382 B2
(45) Date of Patent: Mar. 20, 2007

(54) HYBRID VEHICLE MODE SHIFT CONTROL DEVICE

(75) Inventors: Tomoya Imazu, Yokohama (JP); Shinichiro Joe, Yokohama (JP); Tatsuya Nagato, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 262 days.

(21) Appl. No.: 11/074,741

(22) Filed: Mar. 9, 2005

(65) Prior Publication Data

US 2005/0209044 A1    Sep. 22, 2005

(30) Foreign Application Priority Data

Mar. 17, 2004   (JP) .............................. 2004-077064

(51) Int. Cl.
 *B60W 10/02* (2006.01)
(52) U.S. Cl. .............................................. 477/5; 475/5
(58) Field of Classification Search .................... 475/5; 477/3
 See application file for complete search history.

(56) References Cited

U.S. PATENT DOCUMENTS 5,935,040 A * 8/1999 Tabata et al. ................... 477/3
6,003,626 A * 12/1999 Ibaraki et al. ............. 180/65.2
6,234,930 B1 * 5/2001 Kaneko et al. ................ 475/5
6,450,274 B1 * 9/2002 Konno et al. .............. 180/65.3

FOREIGN PATENT DOCUMENTS

JP        2003-032808 A      1/2003

* cited by examiner

*Primary Examiner*—Roger Pang
*Assistant Examiner*—Derek D. Knight
(74) *Attorney, Agent, or Firm*—Global IP Counselors

(57) ABSTRACT

A hybrid vehicle mode shift control device comprises a drive force combining transmission that includes a differential gear device coupled to an engine, at least one motor, and an output member, an engine clutch configured to connect and disconnect the engine with the differential gear device, and a low brake configured to hold the drive force combining transmission at a lower side gear ratio. The hybrid vehicle is operated at least in an EV mode, an EV-LB mode, an E-iVT mode, and an LB mode. The hybrid vehicle mode shift control device comprises a mode shift control section configured to select one of a mode shift route passing through the E-iVT mode and a mode shift route passing through the EV-LB mode based on the transitional drive force request of the driver when a mode shift request is issued to shift from the EV mode to the LB mode.

11 Claims, 9 Drawing Sheets

(a) EV Mode (b) EV-LB Mode (c) LB Mode (d) E-iVT Mode

HYBRID VEHICLE MODE SHIFT CONTROL DEVICE

CROSS-REFERENCE TO RELATED APPLICATIONS

This application claims priority to Japanese Patent Application No. 2004-077064. The entire disclosure of Japanese Patent Application No. 2004-077064 is hereby incorporated herein by reference.

BACKGROUND OF THE INVENTION

1. Field of the Invention

The present invention generally relates to a hybrid vehicle mode shift control device. More specifically, the present invention relates to a hybrid vehicle mode shift control device configured and arranged to shift a traveling mode of a hybrid vehicle to one of at least an electric vehicle continuously variable transmission mode, an electric vehicle fixed transmission mode, a hybrid vehicle continuously variable transmission mode, and a hybrid vehicle fixed transmission mode.

2. Background Information

Japanese Laid-Open Patent Publication No. 2003-32808 discloses a well-known type of hybrid vehicle that is equipped with a differential gear device configured such that when a transmission of the hybrid vehicle is analyzed using a nomogram (a lever analyze diagram or an alignment chart), the differential gear device is depicted as at least four input and output elements arranged in a row with two or more inner input/output elements lying between two outer input/output elements. The input from an engine of the hybrid vehicle is coupled to one of two inner input/output elements and an output member configured and arranged to deliver an output to a drive system of the hybrid vehicle is coupled to the other of one of the two inner input/output elements. A first motor generator is connected to one of the two outer input/output elements and a second motor generator is connected to the other of the two outer input/output elements. The hybrid vehicle is also provided with a low brake configured and arranged to hold a part of the transmission such that the gear ratio is held fixed to a lower side gear ratio. Thus, the hybrid vehicle disclosed in the above mentioned reference can be operated in one of a plurality of traveling modes including an electric vehicle continuously variable transmission mode, an electric vehicle fixed transmission mode, a hybrid vehicle continuously variable transmission mode, and a hybrid vehicle fixed transmission mode.

In view of the above, it will be apparent to those skilled in the art from this disclosure that there exists a need for an improved hybrid vehicle mode shift control device. This invention addresses this need in the art as well as other needs, which will become apparent to those skilled in the art from this disclosure.

SUMMARY OF THE INVENTION

In the conventional hybrid vehicle as disclosed in the above mentioned reference, when there is a request to shift from one traveling mode to another traveling mode, there are cases in which the shift of the traveling modes cannot be performed directly with a single mode shift operation (e.g., by turning the low brake on or off, or by turning the engine on or off) and the final requested mode must be reached by using a combination of shifts between adjacent traveling modes. In such cases, a plurality of mode shift routes usually exists between the two traveling modes. For example, in the conventional hybrid vehicle as disclosed in the above mentioned reference, when the mode shift request from the electric vehicle continuously variable transmission mode to the hybrid vehicle fixed transmission mode is issued, a plurality of mode shift operations (i.e., turning the low brake on, and turning the engine on) are required to shift from the electric vehicle continuously variable transmission mode to the hybrid vehicle fixed transmission mode. Thus, there are two possible mode shift routes (i.e., a mode shift route passing through the electric vehicle fixed transmission mode, and a mode shift route passing through the hybrid vehicle continuously variable transmission mode) for completing the shift of the traveling modes. If the mode shift control device of the hybrid vehicle is configured to always select the same one of the mode shift routes, then there will be times when limitations imposed by a drive force request and a battery capacity cannot be accommodated through the selected mode shift route.

For example, assume the hybrid vehicle mode shift control device is configured to select only a mode shift route that passes through the hybrid vehicle continuously variable transmission mode when there is a mode shift request for shifting from the electric vehicle continuously variable transmission mode to the hybrid vehicle fixed transmission mode. In such a case, if the mode shift request from the electric vehicle continuously variable transmission mode to the hybrid vehicle fixed transmission mode is issued when the vehicle speed is low enough to engage the low brake and when a drive force requested from a driver is too large to be attained with the hybrid vehicle continuously variable transmission mode, the vehicle will not be able to satisfy the large drive force request by transitionally operating under the hybrid vehicle continuously variable transmission mode.

On the other hand, assume the hybrid vehicle mode shift control device is configured to select only a mode shift route that passes through the electric vehicle fixed transmission mode when there is a mode shift request for shifting from the electric vehicle continuously variable transmission mode to the hybrid vehicle fixed transmission mode. In such case, if the mode shift request from the electric vehicle continuously variable transmission mode to the hybrid vehicle fixed transmission mode is issued when shifting to electric vehicle traveling modes is prohibited due to a decline in the battery SOC (state of charge), then the hybrid vehicle mode shift control device will not be able to accomplish the requested mode shift.

The present invention was conceived in view of the shortcomings in the prior art described above. Thus, one object of the present invention is to provide a hybrid vehicle mode shift control device that uses a transitional drive force request of a driver as a condition for selecting one of the mode shift routes that is better matched to the drive force request when there is a mode shift request for shifting from the electric vehicle continuously variable transmission mode to the hybrid vehicle fixed transmission mode.

In order to achieve the aforementioned object and other objects of the present invention, a hybrid vehicle mode shift control device is provided that comprises a drive force combining transmission, a traveling mode control section, and a mode shift control section. The drive force combining transmission is configured and arranged to selectively combine drive forces generated by an engine and at least one motor to deliver a drive force to a drive system of a vehicle such that the vehicle is selectively driven by the engine and the motor as a hybrid vehicle or solely by the motor as an electric vehicle. The traveling mode control section is configured to control the drive force combining transmission to selectively operate the vehicle in one of a plurality of traveling modes including at least an electric vehicle continuously variable transmission mode, an electric vehicle fixed transmission mode, a hybrid vehicle continuously variable transmission mode, a hybrid vehicle fixed transmission mode. The mode shift control section is configured to select one of a first mode shift route that passes through the hybrid vehicle continuously variable transmission mode and a second mode shift route that passes through the electric vehicle fixed transmission mode in accordance with a transitional drive force request of a driver when a mode shift request is issued to shift the traveling mode from the electric vehicle continuously variable transmission mode to the hybrid vehicle fixed transmission mode.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
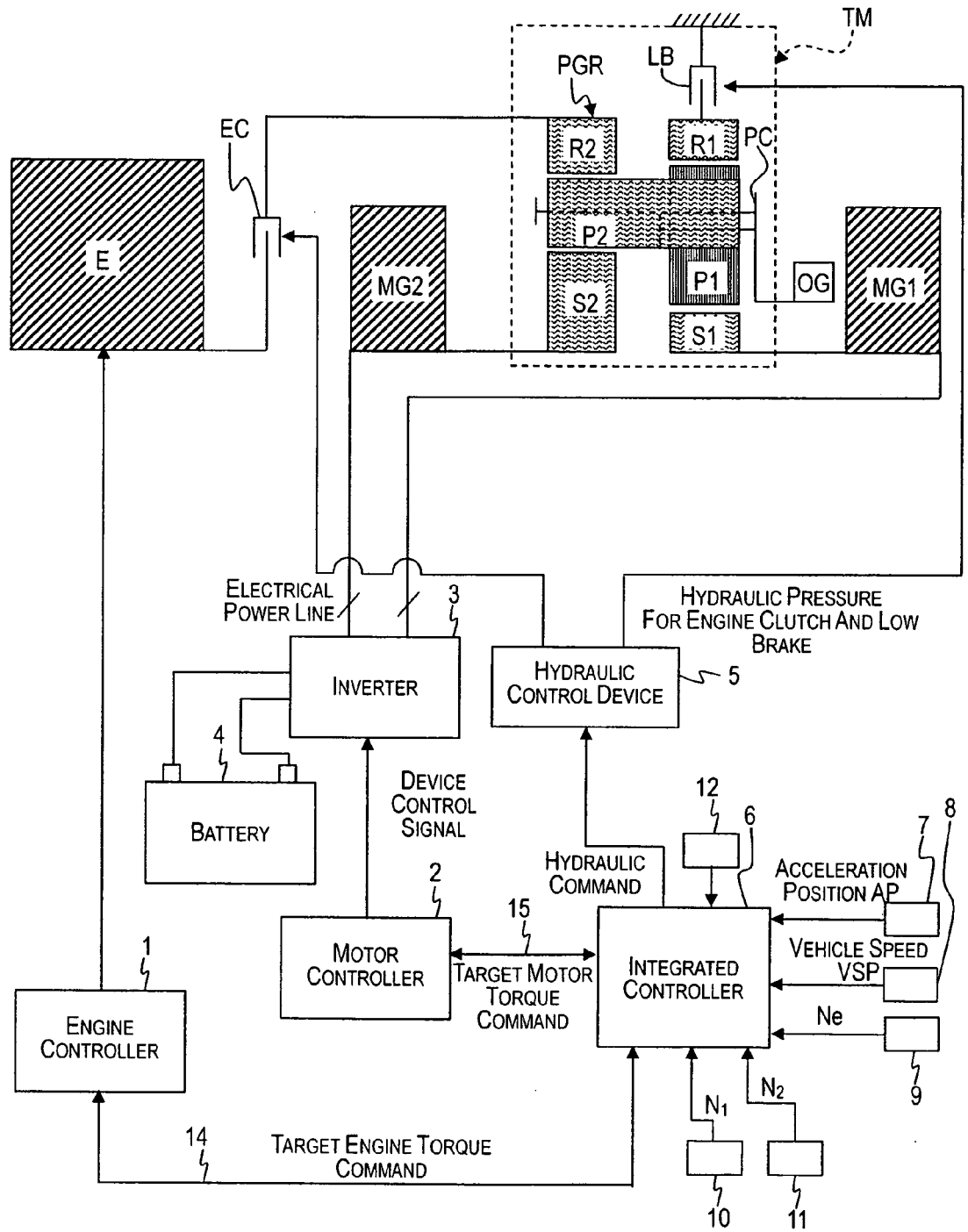
FIG. 1 is an overall system diagram of a hybrid vehicle equipped with a hybrid vehicle mode shift control device in accordance with a preferred embodiment of the present invention.

Referring initially to FIG. 1, constituent features of a drive train of a hybrid vehicle is illustrated in accordance with a preferred embodiment of the present invention. FIG. 1 is an overall system diagram showing the drive train of the hybrid vehicle equipped with a hybrid vehicle mode shift control device in accordance with the preferred embodiment. As shown in FIG. 1, the drive train of the hybrid vehicle basically includes an engine E, a first motor generator MG1, a second motor generator MG2, an output gear OG (an output member), and a drive force combining transmission TM.

The engine E is preferably a gasoline engine or a diesel engine whose throttle valve opening degree and other parameters are controlled based on control commands issued from an engine controller 1. The engine controller 1 will be described in more detail below.

The first motor generator MG1 and the second motor generator MG2 are both preferably synchronous motor generators having a rotor embedded with permanent magnets and a stator wound with a stator coil. The first and second motor generators MG1 and MG2 are controlled independently by being energized with three-phase alternating current delivered from an inverter 3 based on control commands issued from a motor controller 2. The motor controller 2 will be described in more detail below.

The drive force combining transmission TM preferably comprises a Ravigneaux planetary gear set PGR (a differential gear device) and a low brake LB. As seen in FIG. 1, the Ravigneaux planetary gear set PGR comprises a first sun gear S1, a first pinion P1, a first ring gear R1, a second sun gear S2, a second pinion P2, a second ring gear R2, and a common carrier PC. The common carrier PC is configured and arranged to support the first pinion P1 and the second pinion P2, which mesh together. Thus, the Ravigneaux planetary gear set PGR has five rotary members (i.e., the first sun gear S1, the first ring gear R1, the second sun gear S2, the second ring gear R2, and the common carrier PC). The Ravigneaux planetary gear set PGR is a conventional component that is well known in the art. Since the Ravigneaux planetary gear set PGR is well known in the art, the precise structures of the Ravigneaux planetary gear set PGR that are not essential to the present invention will not be discussed or illustrated in detail herein.

The connections between the five rotary members of the Ravigneaux planetary gear set PGR and input and output elements (e.g., the input and output elements coupled to the engine E, the first and second motor generators MG1 and MG2, the output gear OG) will now be explained.

As seen in FIG. 1, the first sun gear S1 is coupled to the first motor generator MG1. The first ring gear R1 is configured and arranged such that the first ring gear R1 can be fastened to a transmission case by the low brake LB. The second sun gear S2 is coupled to the second motor generator MG2. The second ring gear R2 is configured and arranged such that the second ring gear R2 can be coupled to the engine E by engaging an engine clutch EC. The common carrier PC is coupled to the output gear OG. The output gear OG is configured and arranged to transmit the drive force to a pair of left and right drive wheels through a differential and a drive shaft (not shown).

Figure 2:
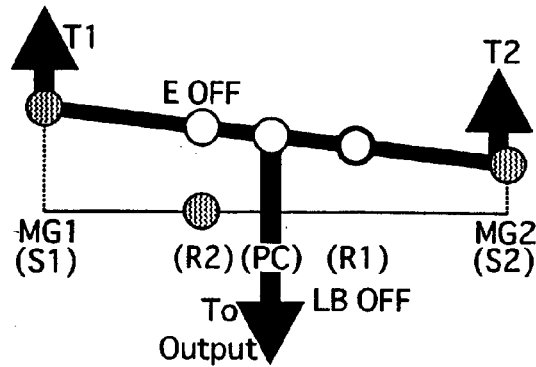
FIG. 2 is a series of nomograms illustrating a plurality of traveling modes achieved with a Ravigneaux planetary gear set utilized in the hybrid vehicle mode shift control device in accordance with the preferred embodiment of the present invention.
Figure 2:
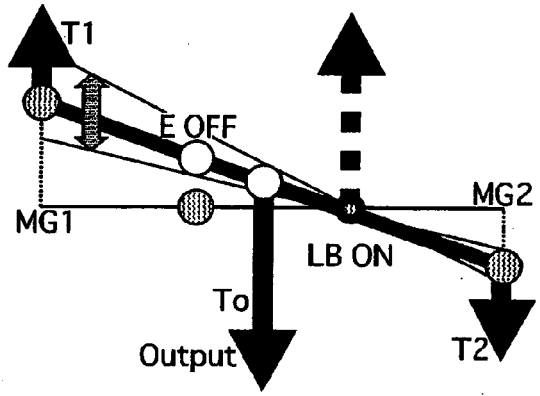
Figure 2:
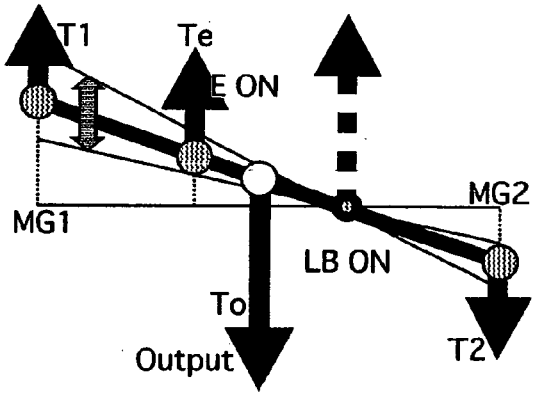
Figure 2:
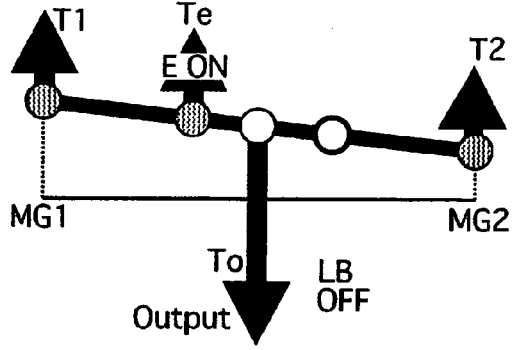

FIG. 2 is a series of nomograms (lever analogy diagrams or alignment charts) illustrating the drive force combining transmission TM with the connections between the rotary members of the Ravigneaux planetary gear set PGR and the input and output elements described above. In these nomograms (a) to (d), a "rigid body lever model" can be adopted to express the dynamic operation of the Ravigneaux planetary gear set PGR in a simple manner. As seen in FIG. 2, the input and output elements are aligned on the rigid body lever model in an order of the first motor generator MG1 (the first sun gear S1), the engine E (the second ring gear R2), the output member (the output gear OG), and the second motor generator MG2 (the second sun gear S2). In this specification, "nomogram" refers to a speed diagram that can be used to find the gear ratios of the differential gear device in a graphical manner that is simpler and easier to understand than using equations. In these nomograms, the rotational speed (rpm) of each rotary member is indicated on the vertical axis, and the rotary members are indicated on the horizontal axis. The spacings between the rotary members are set to correspond to nomogram lever ratios, which are based on the tooth count ratios between the sun gears and ring gears.

The engine clutch EC and the low brake LB are preferably arranged as a multiple plate frictional clutch and a multiple plate frictional brake, respectively. The engine clutch EC and the low brake LB are preferably operated with hydraulic pressure from a hydraulic pressure control device 5 as discussed in more detail below. On the nomograms shown in FIG. 2, the engine clutch EC is arranged in a position corresponding to the engine E and the rotational speed axis of the second ring gear R2, and the low brake LB is arranged in a position corresponding to the rotational speed axis of the first ring gear R1 (between the rotational speed axis of the output gear OG and the rotational speed axis of the second sun gear S2).

Referring back to FIG. 1, the control system of the hybrid vehicle in which the hybrid vehicle mode shift control device of this preferred embodiment is employed will now be described. As shown in FIG. 1, the control system of the hybrid vehicle comprises the engine controller 1, the motor controller 2, the inverter 3, a battery 4, the hydraulic control device 5, an integrated controller 6, an accelerator position sensor 7, a vehicle speed sensor 8, an engine rotational speed sensor 9, a first motor generator rotational speed sensor 10, a second motor generator rotational speed sensor 11, and a second ring gear rotational speed sensor 12.

The integrated controller 6 is configured to receive a signal indicative of an accelerator position AP from the accelerator position sensor 7 and a signal indicative of an engine rotational speed Ne from the engine rotational speed sensor 9, and issue a target engine torque command to the engine controller 1. Based on the target engine torque command, the engine controller 1 is configured to issue a command for controlling an engine operating point (Ne, Te) to, for example, a throttle valve actuator (not shown).

The integrated controller 6 is also configured to receive first and second motor generator rotational speeds $N_1$ and $N_2$, respectively, from the first and second motor generator rotational speed sensors 10 and 11. Each of the first and second motor generator rotational speed sensors 10 and 11 comprises a resolver. The integrated controller 6 is further configured to issue a target motor generator torque command to the motor controller 2. Based on the target generator torque command and other factors, the motor controller 2 is configured to issue a command to the inverter 3 to control the motor operating point ($N_1$, T1) of the first motor generator MG1 and the motor operating point ($N_2$, T2) of the second motor generator MG2 independently. The motor controller 2 is also configured to send the battery SOC information indicating the state of charge of the battery 4 to the integrated controller 6.

The inverter 3 is connected to the stator coil of the first motor generator MG1 and the stator coil of the second motor generator MG2, and is configured and arranged to generate independent three-phase alternating currents based on the command from the motor controller 2. The inverter 3 is also connected to the battery 4 that is configured and arranged to discharge during powering and recharge during regeneration. In other words, the battery 4 is configured and arranged to discharge when the first and second motor generators MG1 and MG2 operate as motors and recharge when the first and second motor generators MG1 and MG2 operate as generators.

The hydraulic pressure control device 5 is configured to receive a hydraulic pressure command from the integrated controller 6, and control the hydraulic pressure so as to engage and disengage the engine clutch EC and the low brake LB independently. The hydraulic pressure control executed by the hydraulic pressure control device 5 also includes half-clutch control, i.e., sliding engagement control and sliding disengagement control.

The integrated controller 6 is configured to receive the signal indicative of the accelerator position AP from the accelerator sensor 7, a signal indicative of the vehicle speed VSP from the vehicle speed sensor 8, the signal indicative of the engine rotational speed Ne from the engine rotational speed sensor 9, the signal indicative of the first motor generator rotational speed $N_1$ from the first motor generator rotational speed sensor 10, a signal indicative of the second motor generator rotational speed $N_2$ from the second motor generator rotational speed sensor 11, and a signal indicative of the engine input rotational speed coin from the second ring gear rotational speed sensor 12. The integrated controller 6 is configured to execute prescribed computer processing based on these input signals and issue control commands to the engine controller 1, the motor controller 2, and the hydraulic pressure control device 5 based on the results of the computer processing.

More specifically, the integrated controller 6 preferably includes a microcomputer with the computer processing programs and other conventional components such as an input interface circuit, an output interface circuit, and storage devices such as a ROM (Read Only Memory) device and a RAM (Random Access Memory) device. The memory circuit stores processing results and control programs that are run by the processor circuit. The integrated controller 6 is operatively coupled to the various components and sensors of the hybrid vehicle in a conventional manner. The internal RAM of the integrated controller 6 stores statuses of operational flags and various control data. The internal ROM of the integrated controller 6 stores the data and maps for various operations. The integrated controller 6 is capable of selectively controlling any of the components of the control system in accordance with the control program. It will be apparent to those skilled in the art from this disclosure that the precise structure and algorithms for the integrated controller 6 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As seen in FIG. 1, the integrated controller 6 and the engine controller 1 are connected by a two-way communication line 14 and the integrated controller 6 and the motor controller 2 are connected by a two-way communication line 15 for information exchange.

Referring to FIG. 2, a plurality of traveling modes of the hybrid vehicle will now be described. The traveling modes of the hybrid vehicle utilized in the hybrid vehicle mode shift control device of the preferred embodiment of the present invention include an electric vehicle continuously variable transmission mode (hereinafter referred as "EV mode"), an electric vehicle fixed transmission mode (hereinafter referred as "EV-LB mode"), a hybrid vehicle fixed transmission mode (hereinafter referred as "LB mode"), and a hybrid vehicle continuously variable transmission mode (hereafter referred as "E-iVT mode").

As shown in the nomogram (a) of FIG. 2, the EV mode is a continuously variable transmission mode in which the vehicle is driven solely by the first and second motor generators MG1 and MG2. Thus, in the EV mode, the engine E is stopped (turned off) and the engine clutch EC is released. In the EV mode, the low brake LB is released.

As shown in the nomogram (b) of FIG. 2, the EV-LB mode is a fixed transmission mode (or a fixed gear ratio mode) in which the vehicle is driven solely by the first and second motor generators MG1 and MG2 and the low brake LB is engaged. Thus, in the EV-LB mode, the engine E is turned off and the engine clutch EC is released. The drive force delivered to the output gear OG is large in this mode because the reduction ratio from the first motor generator MG1 to the output gear OG and the reduction ratio from the second motor generator MG2 to the output gear OG are large as seen in the nomogram (b) of FIG. 2.

As shown in the nomogram (c) of FIG. 2, the LB mode is a fixed transmission mode (or fixed gear ratio mode) in which the vehicle is driven by the engine E in addition to the first and second motor generators MG1 and MG2, and the low brake LB is engaged. Thus, in the LB mode, the engine E is turned on and the engine clutch EC is engaged. The drive force is large in the LB mode because the reduction ratios from the engine E and the first and second motor generators MG1 and MG2 to the output gear OG are large as seen in the nomogram (c) of FIG. 2.

As shown in the nomogram (d) of FIG. 2, the E-iVT mode is a continuously variable transmission mode in which the vehicle is driven by the engine E in addition to the first and second motor generators MG1 and MG2. In the E-iVT mode, the engine E is running and the engine clutch EC is engaged.

Figure 3:
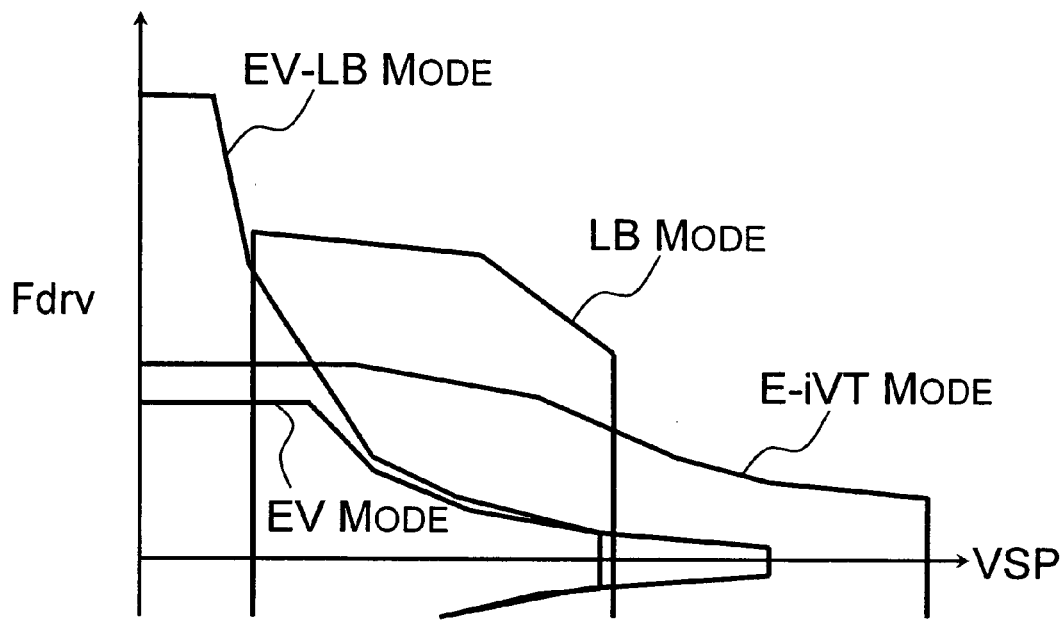
FIG. 3 is a schematic diagram illustrating a traveling mode map utilized in the hybrid vehicle mode shift control device in accordance with the preferred embodiment of the present invention.

The mode shift control among the four traveling modes (i.e., the EV mode, the EV-LB mode, the LB mode, and the E-iVT mode) is executed by the integrated controller 6. Thus, the integrated controller 6 preferably constitutes the traveling mode controlling section and the mode shift control section of the present embodiment. The integrated controller 6 includes a preset traveling mode map, in which the regions corresponding to the four traveling modes are plotted in three-dimensional space based on a requested drive force Fdrv, the vehicle speed VSP, and the battery SOC. The requested drive force Fdrv is preferably calculated based on the accelerator position AP. When the vehicle is stopped or traveling, the integrated controller 6 is configured to search the traveling mode map using detected values for the requested drive force Fdrv, the vehicle speed VSP, and the battery SOC. Then, the integrated controller 6 is configured to select an optimum traveling mode based on the vehicle operating point (which is determined by the requested drive force Fdrv and the vehicle speed VSP) and the battery state of charge. FIG. 3 is an example of the traveling mode map that shows the requested drive force Fdrv and the vehicle speed VSP in two dimensions, which is obtained by slicing a three-dimensional traveling mode map at a particular battery SOC value in a region where the battery is well charged.

Figure 4:
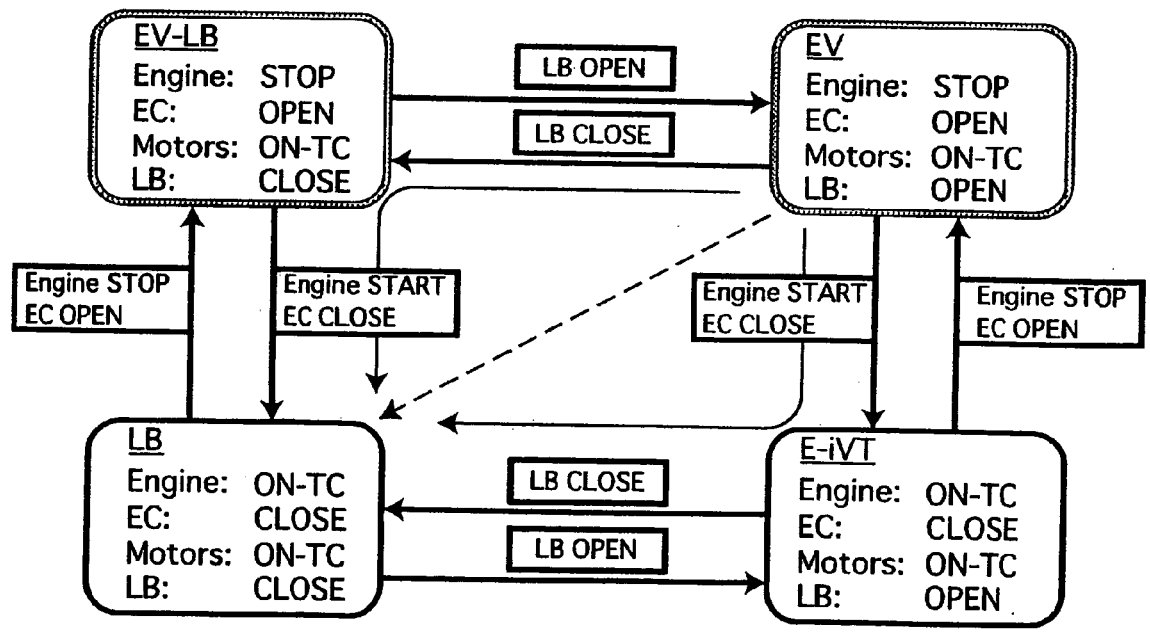
FIG. 4 is a diagram illustrating a plurality of mode shift routes between four traveling modes of the hybrid vehicle with the hybrid vehicle mode shift control device in accordance with the preferred embodiment of the present invention.

FIG. 4 is a diagram illustrating the mode shift operations (e.g., the low brake LB ON/OFF or the engine E ON/OFF) required to shift from one traveling mode to another among the four traveling modes.

When the integrated controller 6 determines that a mode shift between the EV mode and the EV-LB mode is required upon the selection of the traveling mode using the traveling mode map, the integrated controller 6 is configured to send a command to the hydraulic control device 5 so that the low brake LB is engaged (when shifting from the EV mode to the EV-LB mode) or disengaged (when shifting from the EV-LB mode to the EV mode) as shown in FIG. 4. When the integrated controller 6 determines that a mode shift between the E-iVT mode and the LB mode is required upon the selection of the traveling mode using the traveling mode map, the integrated controller 6 is configured to send a command to the hydraulic control device 5 so that the low brake LB is engaged (when shifting from the E-iVT mode to LB mode) or disengaged (when shifting from the LB mode to the E-iVT mode) as shown in FIG. 4. In other words, when the traveling mode is shifted between the traveling modes arranged in a lateral direction as illustrated in FIG. 4 (i.e., the shift between the EV-LB mode and the EV mode, or the shift between the LB mode and the E-iVT mode), the traveling mode is shifted by engaging or disengaging the low brake LB.

When the integrated controller 6 determines that a mode shift between the EV mode and the E-iVT mode is required upon the selection of the traveling mode using the traveling mode map, the integrated controller 6 is configured to send a command to the engine controller 1 and the hydraulic control device 5 so that the engine E is turned on and the engine clutch EC is engaged (when shifting from the EV mode to the E-iVT mode), or the engine E is turned off and the engine clutch EC is disengaged (when shifting from the E-iVT mode to the EV mode) as shown in FIG. 4. When the integrated controller 6 determines that a mode shift between the EV-LB mode and the LB mode is required upon the selection of the traveling mode using the traveling mode map, the integrated controller 6 is configured to send a command to the engine controller 1 and the hydraulic control device 5 so that the engine E is turned on and the engine clutch EC is engaged (when shifting from the EV-LB mode to the LB mode), or the engine E is turned off and the engine clutch is disengaged (when shifting from the LB mode to the EV-LB mode) as shown in FIG. 4. In other words, when the traveling mode is shifted between the traveling modes arranged in a vertical direction as illustrated in FIG. 4 (i.e., the shift between the EV-LB mode and the LB mode, or the shift between the EV mode and the E-iVT mode), the traveling mode is shifted by starting the engine E and engaging the engine clutch EC, or stopping the engine E and disengaging engine clutch EC.

However, some mode shift controls between the traveling modes that are diagonally arranged to each other as shown with a dotted arrow in FIG. 4 (e.g., the shift between the EV mode and the LB mode) cannot be accomplished directly with a single mode shift operation (e.g., turning the low brake LB on or off, or turning the engine E on or off). When the integrated controller 6 determines that there is a request for such a mode shift that requires more than one mode shift operations, the mode shift between two traveling modes is accomplished using a mode shift route selection control as explained below.

Mode Shift Control Processing

Figure 5:
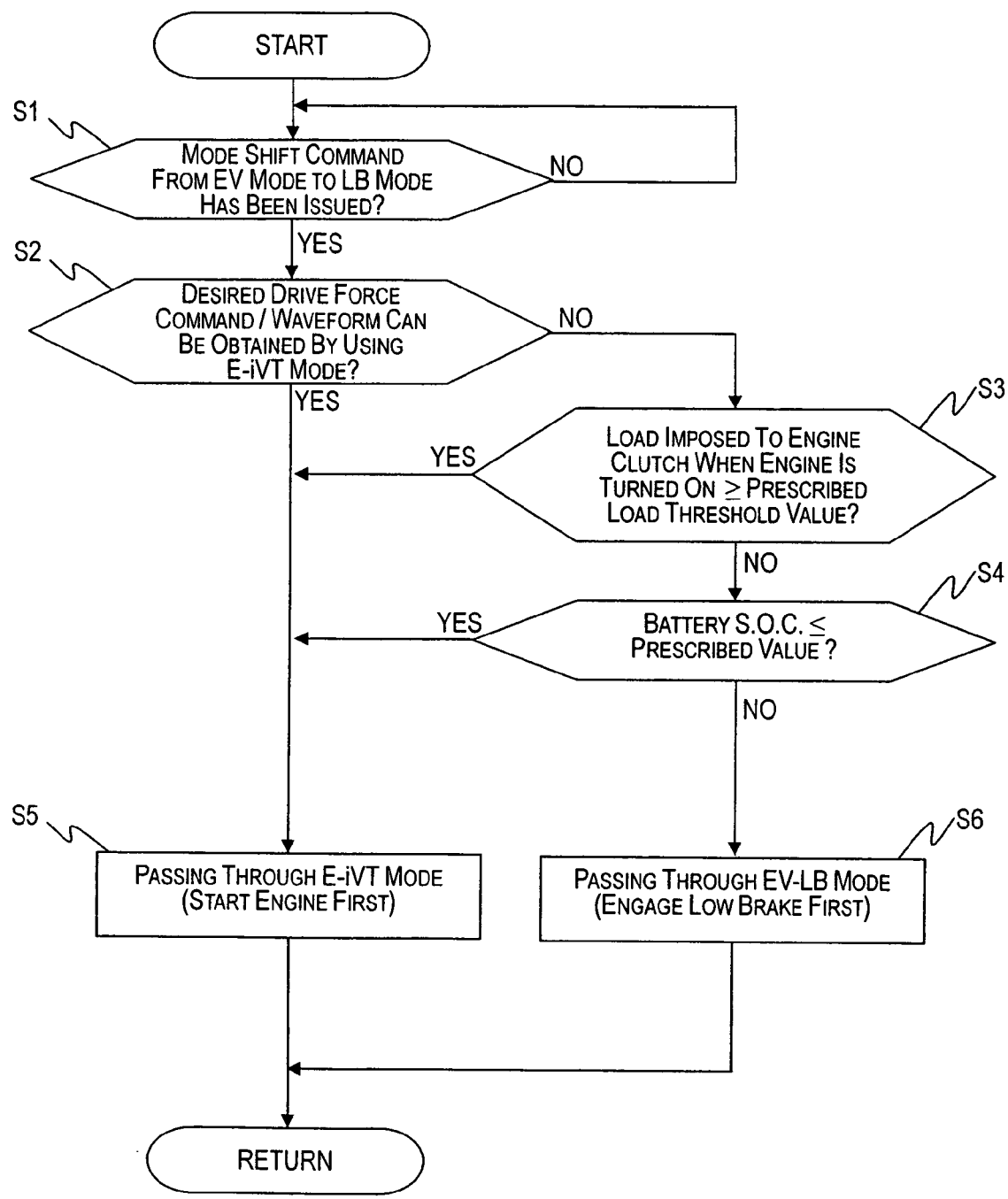
FIG. 5 is a flowchart showing a control flow of a mode shift control processing executed by a integrated controller of the hybrid vehicle mode shift control device when the hybrid vehicle is shifted from an EV mode to an LB mode in accordance with the preferred embodiment of the present invention.

FIG. 5 is a flowchart showing a control flow of the mode shift control processing including the mode shift route selection control executed by the integrated controller 6 of the preferred embodiment when the integrated controller 6 determines a mode shift from the EV mode to the LB mode is required. As explained above, since the EV mode and the LB mode are diagonally arranged to each other in the diagram of FIG. 4, more than one mode shift operations (e.g., low brake ON/OFF or engine ON/OFF) are required to shift from the EV mode to the LB mode. In other words, in this preferred embodiment of the present invention, there are two possible mode shift routes (a first mode shift route that passes through the E-iVT mode, and a second mode shift route that passes through the EV-LB mode) when shifting from the EV mode to the LB mode. In this preferred embodiment of the present invention, the integrated controller 6 is configured and arranged to select one of the two mode shift routes in accordance with the transitional drive force request of the driver by using the control processing described in FIG. 5. The control processing illustrated in the flowchart of FIG. 5 preferably corresponds to the mode shift control section of the present invention.

In step S1 of FIG. 5, the integrated controller 6 is configured to determine if the mode shift command or mode shift request for shifting from the EV mode to the LB mode has been issued. If the integrated controller 6 determines that such mode shift command has been issued (Yes in step S1), the integrated controller 6 is configured to proceed to step S2. If the integrated controller 6 determines that such mode shift command has not been issued (No in step S2), the integrated controller 6 is configured to repeat step S1.

Figure 6:
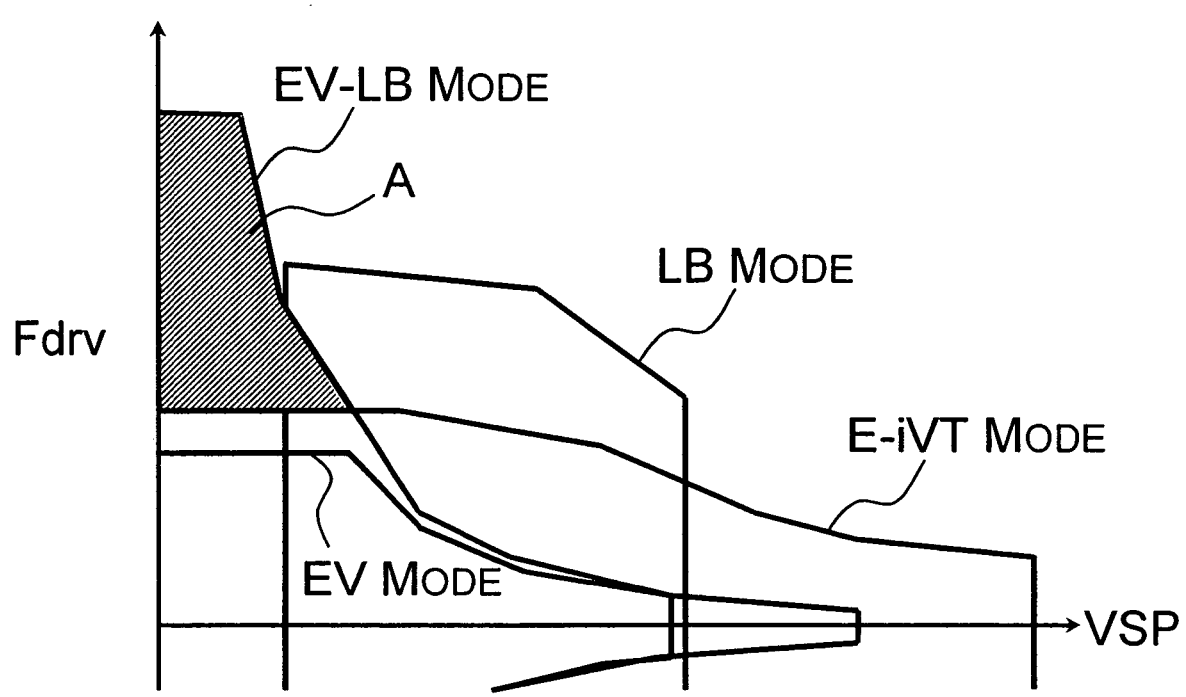
FIG. 6 is a schematic diagram of a traveling mode map illustrating a region where a drive force request cannot be satisfied with an E-iVT mode but can be satisfied by an EV-LB mode in accordance with the preferred embodiment of the present invention.

Based on the determination in step S1 that the mode shift command for shifting from the EV mode to the LB mode has been issued, the integrated controller 6 is configured to determine if a desired drive force command or waveform, which accommodates a transitional drive force request of a driver, can be obtained with the E-iVT mode in step S2. If the integrated controller 6 determines that the desired drive force command or waveform can be obtained with the E-iVT mode (Yes in step S2), the integrated controller 6 is configured to proceed to step S5. If the integrated controller 6 determines that the desired drive force command or waveform cannot be obtained with the E-iVT mode (No in step S2), the integrated controller 6 is configured to proceed to step S3. The expression "desired drive force command or waveform" is used herein because there are cases in which the drive force commands from the driver are arranged into a transitional drive force waveform. In order to determine if the desired drive force command or waveform can be obtained with the E-iVT mode, the integrated controller 6 is configured to compare the map curve for the EV-LB mode and the map curve for the E-iVT mode. As seen in the traveling mode map of FIG. 6, the drive force that can be obtained with the EV-LB mode is larger than the drive force that can be obtained with the E-iVT mode in the cross hatched region A. Thus, if the desired drive force command or waveform passes through the region A shown in FIG. 6, then the integrated controller 6 is configured to determine that the desired drive force command or waveform cannot be obtained with the E-iVT mode.

When the integrated controller 6 determines in step S2 that the desired drive force command or waveform cannot be obtained with the E-iVT mode, the integrated controller 6 is configured to determine if the load imposed on the engine clutch EC when the engine is turned on will be equal to or greater than a predetermined load threshold value when the traveling mode is shifted from the EV-LB mode to the LB mode in step S3. If the load imposed on the engine clutch EC is equal to or greater than the predetermined load threshold value (Yes in step S3), the integrated controller 6 is configured to proceed to step S5. If the load imposed on the engine clutch EC will be less than the predetermined load threshold value (No in step S3), the integrated controller 6 is configured to proceed to step S4.

The predetermined load threshold value used in step S3 is determined based on a value corresponding to a load level that could compromise the life of the engine clutch EC when the load is applied to the engine clutch EC when the engine E is turned on.

In step S4, based on the determination in step S3 that the load imposed on the engine clutch EC when the engine E starts will be less than the predetermined load threshold value, the integrated controller 6 is configured to determine if the battery SOC is equal to or less than a prescribed value. If the battery SOC is equal to or less than the prescribed value (Yes in step S4), the integrated controller 6 is configured to proceed to step S5. If the battery SOC is greater than the prescribed value (No in step S5), the integrated controller 6 is configured to proceed to step S6.

The prescribed value of the battery SOC is preferably set based on the maximum electric power that will be consumed by the first and second motor generators MG1 and MG2 if the mode shift route that shifts from the EV mode passing through the EV-LB mode to the LB mode is selected.

If the determination in step S2, S3, or S4 is Yes, then the integrated controller 6 is configured to proceed to step S5 as mentioned above. In step S5, the integrated controller 6 is configured to select the mode shift route that passes through the E-iVT mode. In such a case, the engine E is turned on earlier than the engine E would be turned on if the mode shift route that passes through the EV-LB mode was selected. In other words, in step S5, the integrated controller 6 is configured to first start the engine E before engaging the low brake LB so that the traveling mode is shifted in the mode shift route that shifts from the EV mode to the E-iVT mode and then to the LB mode.

When the determinations in all of steps S2, S3, and S4 are No, then the integrated controller 6 is configured to proceed to step S6 and select the mode shift route that passes through the EV-LB mode. Thus, the integrated controller 6 is configured to engage the low brake LB. In other words, in step S6, the integrated controller 6 is configured to first engage the low brake LB before starting the engine E so that the traveling mode is shifted in the mode shift route that shifts from the EV mode to the EV-LB mode and then to the LB mode.

Mode Shift Route Selection Standards

With the hybrid vehicle mode shift control device in accordance with the present invention, the following factors are taken into consideration when selecting the mode shift route when there is a request to shift from one traveling mode to another traveling mode and the shift between the two modes cannot be made directly with a single mode shift operation.

(1) A drive force priority traveling mode and a normal traveling mode are established and the mode shift route is selected in accordance with the traveling mode that is in effect.

(2) The mode shift route with which the transitional drive force restrictions (fluctuations) are small or non-existent at each transitional mode step (each transitional mode shift) is selected.

(3) The mode shift route with which the total time (estimated value) required to pass through the each transitional mode step (each transitional mode shift) is shorter is selected.

(4) The mode shift route with the minimum restrictions on the transitional drive force is given priority over the mode shift route having the shorter shift time (i.e., over the route that does not require turning the engine E on or off).

(5) The mode shift route that results in the engine E being turned off later is selected.

(6) The mode shift route that puts a smaller load on the engine clutch EC or the low brake LB is selected.

(7) The mode shift route that is easier to accomplish in view of the mode shift that is anticipated to follow is selected. The mode shift route for which the transitional mode is easer to return from is selected. For example, a mode shift request is triggered by the battery SOC, the traveling mode is preferably shifted in the vertical direction of FIG. 4 because the possibility of the mode shift being immediately canceled is small. Conversely, when a mode shift request is triggered by a change in the drive force request, the traveling mode is preferably shifted in the horizontal direction of FIG. 4. However, the priority is given to shifting in the downward direction of FIG. 4 (i.e., in the direction of turning on the engine E) when the drive force is increased.

Operational Effects of Mode Shift Control

The mode shift control processing of the preferred embodiment described in the flow chart in FIG. 5 is determined based on the mode shift route selection standards described above. When there is a request to shift the traveling mode from the EV mode to the LB mode and the desired drive force command or waveform can be achieved with the E-iVT mode, the integrated controller 6 is configured to execute the steps S1, S2, S5 of the flowchart shown in FIG. 5 sequentially in order as listed. In step S5, the integrated controller 6 is configured to select the mode shift route that shifts the traveling mode from the EV mode to the E-iVT mode and then to the LB mode.

When there is a request to shift the traveling mode from the EV mode to the LB mode and the desired drive force command or waveform cannot be achieved with the E-iVT mode, but the load imposed on the engine clutch EC when the engine is turned on will be equal to or greater than the predetermined load threshold value if the traveling mode is shifted through the EV-LB mode to the LB mode, the integrated controller 6 is configured to execute the steps S1, S2, S3, and S5 of the flowchart shown in FIG. 5 sequentially in order as listed. In step S5, the integrated controller 6 is configured to select the mode shift route that shifts the traveling mode from the EV mode to the E-iVT mode and then to the LB mode.

When there is a request to shift the traveling mode from the EV mode to the LB mode, the desired drive force command or waveform can not be achieved with the E-iVT mode, and the load imposed on the engine clutch EC when the engine E starts will be less than the predetermined load threshold value even if the traveling mode is shifted from the EV-LB mode to the LB mode, but the battery SOC is equal to or less than the prescribed value, the integrated controller 6 is configured to execute the steps S1, S2, S3, S4, and S5 of the flowchart shown in FIG. 5 sequentially in order as listed. In step S5, the integrated controller 6 is configured to select the mode shift route that shifts the traveling mode from the EV mode to the E-iVT mode and then to the LB mode.

On the other hand, when there is a request to shift the mode from the EV mode to the LB mode, the desired drive force command or waveform can not be achieved with the E-iVT mode, the load imposed on the engine clutch EC when the engine starts will be less than the predetermined load threshold value even if the traveling mode is shifted through the EV-LB mode to the LB mode, and the battery SOC is greater than the prescribed value, the integrated controller 6 is configured to execute the steps S1, S2, S3, S4, and S6 of the flowchart shown in FIG. 5 sequentially in order as listed. In step S6, the integrated controller 6 is configured to select the mode shift route that shifts the traveling mode from the EV mode to the EV-LB mode and then to the LB mode.

Operational Effect of Mode Shift Route that Passes Through E-iVT Mode

The characteristic features of the mode shift route that passes through the E-iVT mode will now be explained. When the mode shift route that passes through the E-iVT mode is used, the engine E is started under optimum conditions. Therefore, the drive force shock that occurs when the engine E starts is small, there is little heating and wear of the engine clutch EC, and resonant vibration of the power train is held to a low level. Moreover, the actual drive force rises toward the target drive force with good response because additional torque is provided by starting the engine E. Furthermore, the mode shift route that passes through the E-iVT mode can be used when electric vehicle modes are prohibited due to a decline in the battery SOC.

Therefore, when the mode is shifted from the EV mode to the LB mode, the mode shift route that passes through the E-iVT mode is given priority over the mode shift route that passes through the EV-LB mode.

The operational effects of the shift operation including starting the engine E when the travel mode is shifted from the EV mode to the LB mode via the E-iVT mode will now be described with reference to the nomograms (a) to (d) in FIG. 7.

Figure 7:
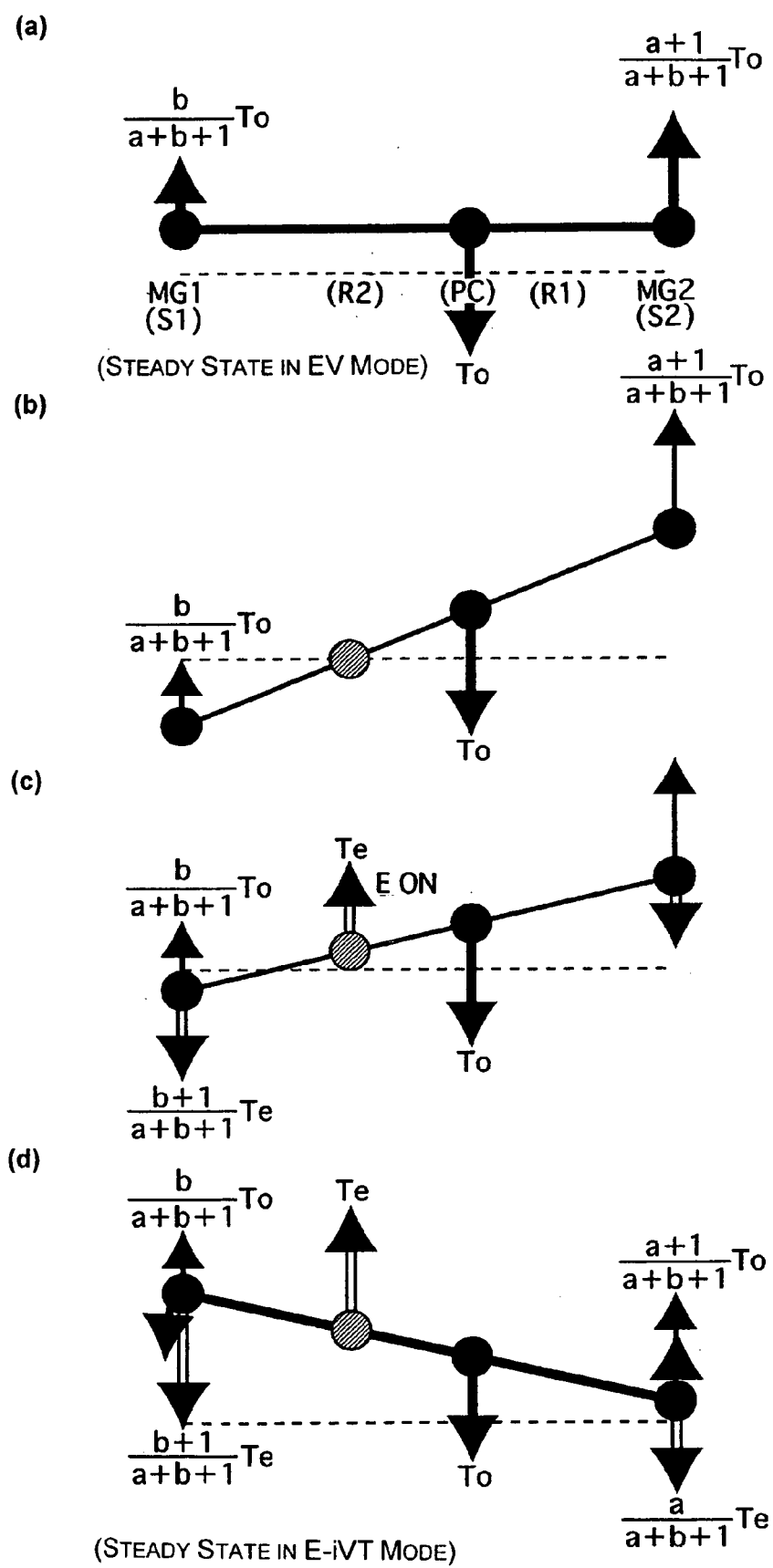
FIG. 7 is a series of nomograms illustrating operational effects of starting the engine when the traveling mode is shifted from the EV mode to the LB mode through the E-iVT mode in accordance with the preferred embodiment of the present invention.

The nomogram (a) of FIG. 7 illustrates a steady state in the EV mode. As seen in the nomogram (b) of FIG. 7, a rotational moment is applied to the lever of the nomogram about the output gear OG in the counterclockwise direction from the steady state in the EV mode such that the rotational speed of the second ring gear R2 that will be connected to the engine E is zero. The engine clutch EC is connected at the point in time when the rotational speed of the second ring gear R2 becomes zero and a rotational moment is applied to the lever of the nomogram such that the lever rotates clockwise about the output coupled to the output gear OG. Therefore, the rotational speed of the engine E is increased. When the state shown in the nomogram (c) of FIG. 7 is reached, the engine E is started by supplying fuel and executing spark ignition. After the engine E is started, the rotational speed of the engine E is increased until the hybrid vehicle is put into a steady state in the E-iVT mode, as shown in the nomogram (d) of FIG. 7.

Thus, when the traveling mode is shifted from the EV mode to the E-iVT mode and then to the LB mode, the rotational speeds of the first and second motor generators MG1 and MG2 are adjusted such that the rotational speed of the second ring gear R2 that connects to the engine E becomes zero before the engine E is started. As a result, the engine clutch EC does not have to be subjected to a dynamic frictional contact load in order to start the engine E and the drive force shock resulting from starting the engine E can be held to a low level. Furthermore, heating and wearing of the engine clutch EC are curbed and the life of the engine clutch EC is prevented from being degraded.

The characteristic of the actual drive force with respect to the target drive force for a case in which the mode is shifted from the EV mode to the E-iVT mode and then to the LB mode will now be described.

Figure 8A:
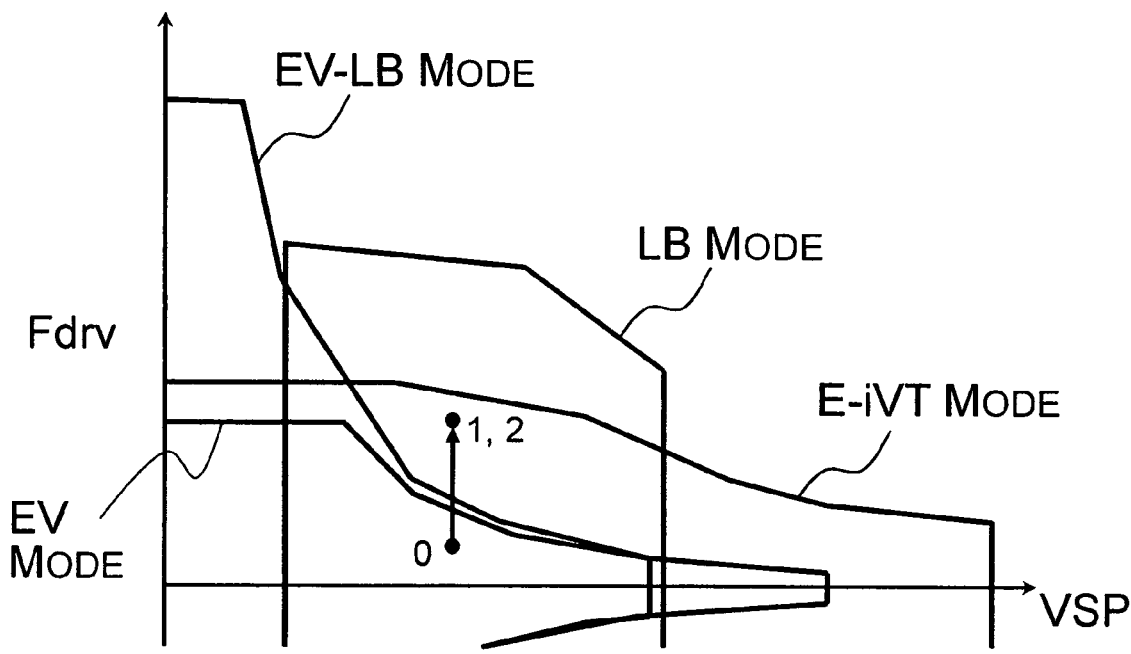
FIG. 8(a) is a schematic diagram of the traveling mode map including operating points of the hybrid vehicle in a first example of a relationship between a target drive force and an actual drive force when the traveling mode is shifted from the EV mode to the LB mode through the E-iVT mode in accordance with the preferred embodiment of the present invention.
Figure 8B:
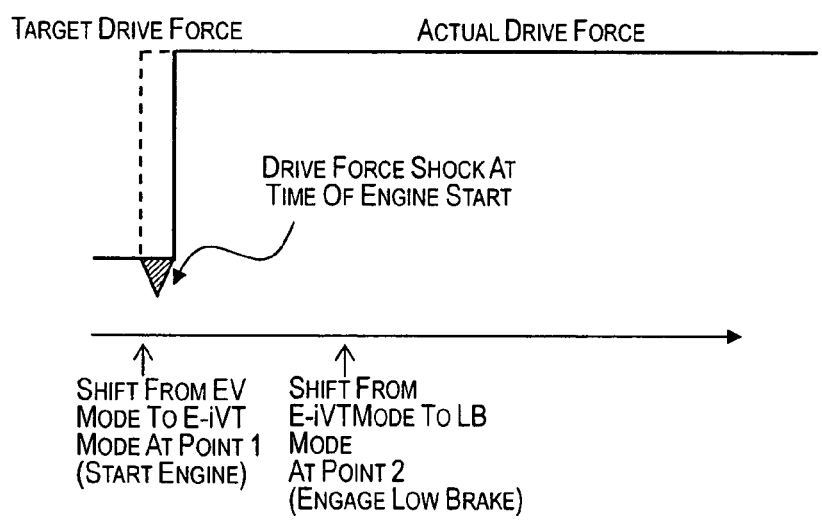
FIG. 8(b) is a characteristic diagram illustrating the relationship between the target drive force and the actual drive force in the first example shown in FIG. 8(a) when the traveling mode is shifted from the EV mode to the LB mode through the E-iVT mode in accordance with the preferred embodiment of the present invention.

FIG. 8(a) is a schematic diagram of the traveling mode map illustrating when the operating point of the hybrid vehicle moves from the operating point 0 in the EV mode region to the operating point 1 and to the operating point 2 in the E-iVT and LB mode region, and a mode shift command is issued for shifting from the EV mode to the LB mode. The target drive force in this first example is of a value that can be achieved with the E-iVT mode. FIG. 8(b) shows the relationship between the target drive force and the actual drive force in the first example shown in FIG. 8(a) for a case in which the mode shift route that passes through the E-iVT mode is selected. By starting the engine E and shifting from the EV mode to the E-iVT mode at the operating point 1 in FIG. 8(a), the actual drive force can be raised to the target drive force in the small amount of time that is required for startup of the engine E to be completed after engine startup is commenced at operating point 1.

Figure 9A:
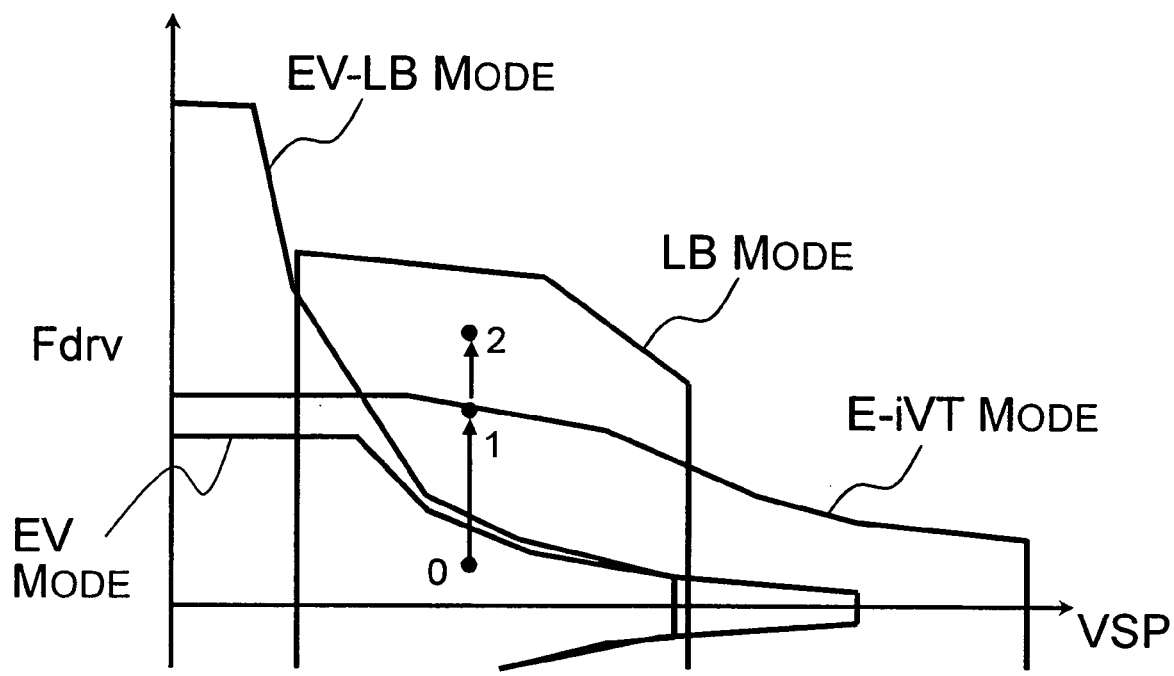
FIG. 9(a) is a schematic diagram of the traveling mode map including operating points of the hybrid vehicle in a second example of the relationship between the target drive force and the actual drive force when the traveling mode is shifted from the EV mode to the LB mode through the E-iVT mode in accordance with the preferred embodiment of the present invention.
Figure 9B:
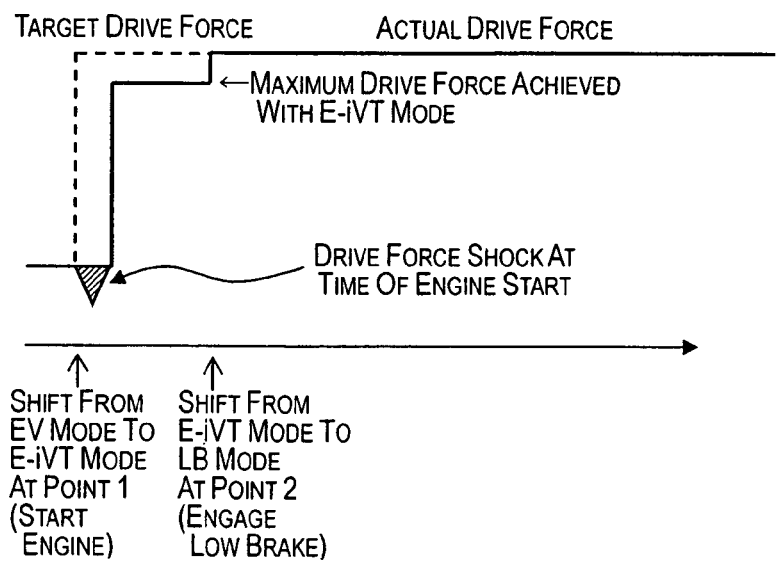
FIG. 9(b) is a characteristic diagram illustrating the relationship between the target drive force and the actual drive force in the second example shown in FIG. 9(a) when the traveling mode is shifted from the EV mode to the LB mode through the E-iVT mode in accordance with the preferred embodiment of the present invention.

FIG. 9(a) is a schematic diagram of the traveling mode map illustrating when the operating point of the hybrid vehicle moves from the operating point 0 in the EV mode region to the operating point 2 in the LB mode region and a mode shift command is issued for shifting from the EV mode to the LB mode. The target drive force in this second example is of a value that can be achieved with the LB mode but not the E-iVT mode. FIG. 9(b) shows the relationship between the target drive force and the actual drive force in the second example shown in FIG. 9(a) for a case in which the mode shift route that passes through the E-iVT mode is selected. By starting the engine E and shifting from the EV mode to the E-iVT mode at the operating point 1, the actual drive force can be raised to the maximum drive force possible with the E-iVT mode in the small amount of time that is required for startup of the engine E to be completed after engine startup is commenced at operating point 1. The actual drive force can then be raised to the target drive force by connecting the low brake LB at the operating point 2.

Thus, when the mode shift route that passes through the E-iVT mode is selected in response to a mode shift command calling for a shift from the EV mode to the LB mode, the actual drive force can be raised to the target drive force with good response because of the additional torque that is provided by starting the engine E.

Operational Effect of Mode Shift Route that Passes Through EV-LB Mode

The characteristic features of the mode shift route that passes through the EV-LB mode will now be explained. When there is a request for a large drive force and when the vehicle is in a low speed region where the low brake LB can be engaged, the drive force request can be satisfied by selecting the mode shift route that passes through the EV-LB mode. Moreover, the total time required for the mode shift is shorter because changes in gear ratio are minimized. Furthermore, the amount of motor torque required to start the engine E is reduced because the engine E is started with the low brake LB being engaged.

Therefore, when the mode is shifted from the EV mode to the LB mode in the present invention, the mode shift route that passes through the EV-LB mode is only selected when a large drive torque is demanded.

The characteristic of the actual drive force with respect to the target drive force for a case in which the mode is shifted from the EV mode to the EV-LB mode and then to the LB mode will now be described.

Figure 10A:
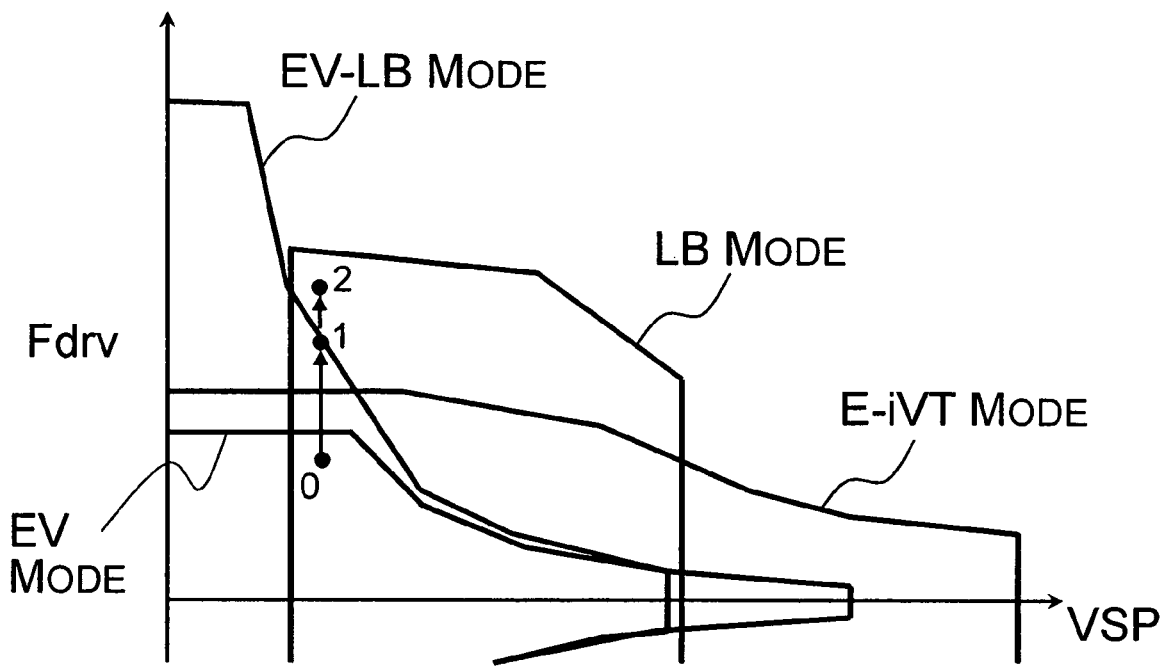
FIG. 10(a) is a schematic diagram of the traveling mode map including operating points of the hybrid vehicle in one example of the relationship between the target drive force and the actual drive force when the traveling mode is shifted from the EV mode to the LB mode through the EV-LB mode in accordance with the preferred embodiment of the present invention.
Figure 10B:
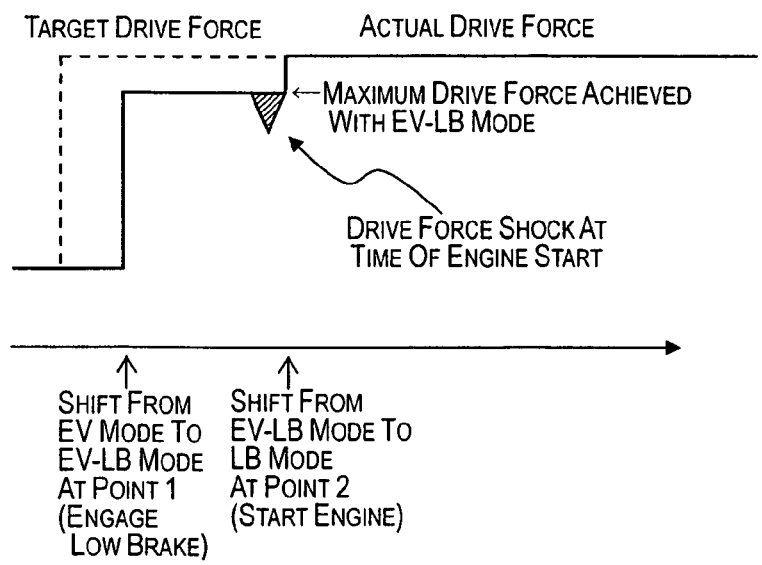
FIG. 10(b) is a characteristic diagram illustrating the relationship between the target drive force and the actual drive force in the example shown in FIG. 10(a) when the traveling mode is shifted from the EV mode to the LB mode through the EV-LB mode in accordance with the preferred embodiment of the present invention.

FIG. 10(a) is a schematic diagram of the travel mode map illustrating when the operating point of the hybrid vehicle moves from the operating point 0 in the EV mode region to the operating point 2 in the LB mode region and a mode shift command is issued for shifting from the EV mode to the LB mode. The target drive force in this example is of a value that can be achieved with the LB mode but not the E-iVT mode. When the operating point moves from the operating point 0 to the operating point 2 as in the example shown in FIG. 10(a), the transitional path from the operating point 0 to operating point 2 passes through the cross hatched region A shown in FIG. 6. Thus, in such case, the mode shift route that passes through the EV-LB mode is preferably selected in the present invention. FIG. 10(b) shows the relationship between the target drive force and the actual drive force for a case in which the mode shift route that passes through the EV-LB mode is selected when the operating point of the hybrid vehicle moves from the operating point 0 to operating point 2 passing though the operating point 1 in FIG. 10(*a*). By engaging the low brake LB and shifting from the EV mode to the EV-LB mode at the operating point 1, the actual drive force can be raised to the maximum drive force possible with the EV-LB mode as seen in FIG. 10(*b*). Then, by starting the engine E and shifting from the EV-LB mode to the LB mode at operating point 2, the actual drive force can be raised to the target drive force in the small amount of time that is required for startup of the engine to be completed.

Thus, when the mode shift route that passes through the EV-LB mode is selected in response to a mode shift command calling for a shift from the EV mode to the LB mode, a request for a large drive force can be satisfied if the hybrid vehicle is in a low speed region where the low brake LB can be engaged.

As explained above, the hybrid vehicle mode shift control device of the preferred embodiment comprises the drive force combining transmission TM, the traveling mode control section, and the mode shift control section (i.e., the integrated controller 6). The drive force combining transmission TM basically comprises the differential gear device that is coupled to an engine E, the first and second motor generators MG1 and MG2, and the output member (output gear OG), the engine clutch EC capable of connecting and disconnecting the engine E with the differential gear device, and the low brake LB configured to hold the drive force combining transmission TM at a lower side gear ratio. The traveling mode control section is configured to selectively choose one of the EV mode, the EV-LB mode, the E-iVT mode, and the LB mode. In the EV mode, the engine E is stopped, the engine clutch EC is released, the first and second motor generators MG1 and MG2 are operated, and the low brake LB is released. In the EV-LB mode, the engine E is stopped, the engine clutch EC is released, the first and second motor generators MG1 and MG2 are operated, and the low brake LB is engaged. In the E-iVT mode, the engine E is operated, the engine clutch EC is engaged, the first and second motor generators MG1 and MG2 are operated, and the low brake LB is released. In the LB mode, the engine E is operated, the engine clutch EC is engaged, the first and second motor generators MG1 and MG2 are operated, and the low brake LB is engaged.

The mode shift control section of the hybrid vehicle mode shift control device of the preferred embodiment is configured to select one of the first mode shift route that passes through the E-iVT mode and the second mode shift route that passes through the EV-LB mode when a mode shift request is issued to change from the EV mode to the LB mode. The mode shift control section is configured to select one of the first and second mode shift routes in accordance with the transitional drive force request of the driver. As a result, when there is a request to shift from the EV mode to the LB mode, the mode shift route that is better matched to the drive force request can be selected because the transitional drive force request of the driver is used as a condition for selecting the mode shift route.

With the present invention, when the mode shift request is issued to change from the EV mode to the LB mode, the mode shift control section is configured to prioritize the first mode shift route by selecting the second mode shift route only when the transitional drive force request of the driver cannot be satisfied by using the E-iVT mode, since the E-iVT mode increases the actual drive force toward the target drive force with good response and causes little drive force shock when the engine E starts. Thus, the second mode shift route that passes through the EV-LB mode is selected when the transitional drive force request is large and the first mode shift route is selected at all other times to reap the benefits of that mode shift route. For example, the drive force shock that occurs when the engine E is started is small, there is little heating or wear of the engine clutch EC, and resonant vibration of the power train is held to a low level, and the actual drive force rises toward the target drive force with good response.

When the mode shift request is issued to shift from the EV mode to the LB mode and when the integrated controller 6 determines that shifting from the EV-LB mode to the LB mode will cause the load imposed on the engine clutch EC to be too large, the mode shift control section is configured to select the first mode shift route even if the transitional drive force request of the driver cannot be satisfied using the E-iVT mode. As a result, the durability and reliability of the engine clutch EC can be ensured for a long period of time.

When the mode shift request is issued to shift from the EV mode to the LB mode and when the battery capacity is equal to or below a prescribed capacity, the mode shift control section is configured to select the first mode shift route even if the transitional drive force request of the driver cannot be satisfied by using the E-iVT mode and even when it is determined that the load imposed on the engine clutch EC by shifting from the EV-LB mode to the LB mode will not be too large. As a result, the traveling mode can be shifted from the EV mode to the LB mode quickly even when shifting to electric vehicle modes is prohibited.

Furthermore, with the present invention, the differential gear device is arranged as the Ravigneaux planetary gear set PGR. The Ravigneaux planetary gear set PGR is configured and arranged such that when the drive force combining transmission is analyzed using a nomogram (lever analogy diagram), the Ravigneaux planetary gear set PGR is depicted as at least four input and output elements arranged in a row with two or more inner input/output elements lying between two outer input/output elements. The input from the engine E is assigned to one of two inner input/output elements, the output member (output gear OG) delivering output to the drive system is assigned to the other of the two inner input/output elements. The first motor generator MG1 is connected to one of the two outer input/output elements. The second motor generator MG2 is connected to the other of the two outer input/output elements. Moreover, the low brake LB is arranged as a frictional holding element that is configured and arranged to hold stationary a rotary member of the Ravigneaux type planetary gear PGR set and positioned in the nomogram on the opposite side of the output gear OG as the engine E such that the output gear OG is located between the engine E and the low brake LB. As a result, a rigid body lever model can be adopted to express the dynamic operation of the Ravigneaux planetary gear set PGR during mode shift control in a simple manner.

Although the preferred embodiment described above presents the drive force combining transmission TM equipped with the differential gear device, the engine clutch EC, and the low brake LB and having four traveling modes (i.e., the EV mode, the EV-LB mode, the E-iVT mode, and the LB mode), the invention can also be applied to a hybrid vehicle with a drive force combining transmission having greater number of the frictional holding elements and more than four traveling modes. The invention can also be applied to a case in which the differential gear device is not a Ravigneaux planetary gear set PGR but, instead, another design of differential gear device, e.g., a differential gear device equipped with a plurality of simple planetary gear sets.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hybrid vehicle mode shift control device comprising:
    a drive force combining transmission configured and arranged to selectively combine drive forces generated by an engine and at least one motor to deliver a drive force to a drive system of a vehicle such that the vehicle is selectively driven by the engine and the motor as a hybrid vehicle or solely by the motor as an electric vehicle;
    a traveling mode control section configured to control the drive force combining transmission to selectively operate the vehicle in one of a plurality of traveling modes including at least an electric vehicle continuously variable transmission mode, an electric vehicle fixed transmission mode, a hybrid vehicle continuously variable transmission mode, a hybrid vehicle fixed transmission mode; and
    a mode shift control section configured to select one of a first mode shift route that passes through the hybrid vehicle continuously variable transmission mode and a second mode shift route that passes through the electric vehicle fixed transmission mode in accordance with a transitional drive force request of a driver when a mode shift request is issued to shift the traveling mode from the electric vehicle continuously variable transmission mode to the hybrid vehicle fixed transmission mode.

2. The hybrid vehicle mode shift control device as recited in claim 1, wherein
    the drive force combining transmission includes
        a differential gear device configured and arranged to be coupled to the engine, the motor, and the output member,
        an engine clutch configured and arranged to selectively connect and disconnect the engine with the differential gear device, and
        a low brake configured and arranged to hold a gear ratio of the drive force combining transmission at a lower side gear ratio.

3. The hybrid vehicle mode shift control device as recited in claim 2, wherein
    the traveling mode control section is configured to control the drive force combining transmission so that
        the engine is stopped, the engine clutch is released, the motor is operated, and the low brake is released in the electric vehicle continuously variable transmission mode,
        the engine is stopped, the engine clutch is released, the motor is operated, and the low brake is engaged in the electric vehicle fixed transmission mode,
        the engine is operated, the engine clutch is engaged, the motor is operated, and the low brake is released in the hybrid vehicle continuously variable transmission mode, and
        the engine is operated, the engine clutch is engaged, the motor is operated, and the low brake is engaged in the hybrid vehicle fixed transmission mode.

4. The hybrid vehicle mode shift control device as recited in claim 3, wherein
    the mode shift control section is further configured to prioritize the first mode shift route over the second mode shift route by selecting the second mode shift route only when the mode shift control section determines that the transitional drive force request of the driver cannot be satisfied by using the hybrid vehicle continuously variable transmission mode when the mode shift request is issued to shift from the electric vehicle continuously variable transmission mode to the hybrid vehicle fixed transmission mode.

5. The hybrid vehicle mode shift control device as recited in claim 4, wherein
    the mode shift control section is further configured to select the first mode shift route when the mode shift control section determines that a load imposed to the engine clutch upon starting of the engine will be equal to or greater than a predetermined load threshold value if the traveling mode is shifted by using the second mode shift route when the mode shift request is issued to shift from the electric vehicle continuously variable transmission mode to the hybrid vehicle fixed transmission mode, regardless of whether the transitional drive force request of the driver cannot be satisfied by using the hybrid vehicle continuously variable transmission mode.

6. The hybrid vehicle mode shift control device as recited in claim 5, wherein
    the mode shift control section is configured to select the first mode shift route when the mode shift control section determines that a battery capacity is equal to or less than a prescribed capacity when the mode shift request is issued to shift from the electric vehicle continuously variable transmission mode to the hybrid vehicle fixed transmission mode, regardless of whether the transitional drive force request of the driver cannot be satisfied by using the hybrid vehicle continuously variable transmission mode and regardless of whether the load imposed to the engine clutch upon starting of the engine will be equal to or greater than the predetermined load threshold value if the traveling mode is shifted by using the second mode shift route.

7. The hybrid vehicle mode shift control device as recited in claim 6, wherein the differential gear device is arranged as a Ravigneaux planetary gear set configured and arranged such that when the drive force combining transmission is analyzed using a nomogram, the Ravigneaux planetary gear set is depicted as at least four input/output elements arranged in a row with first and second inner input/output elements lying between first and second outer input/output elements, an input from the engine being assigned to the first inner input/output elements, an output member delivering output to the drive system of the vehicle being assigned to the second inner input/output elements, a first motor generator being connected to the first outer input/output elements, and a second motor generator being connected to the second outer input/output elements, and the low brake is arranged as a frictional holding member configured and arranged to hold stationary a rotary member of the Ravigneaux type planetary gear set and positioned in the nomogram on the opposite side of the output member as the engine such that the output member is located between the engine and the low brake.

8. The hybrid vehicle mode shift control device as recited in claim 1, wherein the mode shift control section is further configured to prioritize the first mode shift route over the second mode shift route by selecting the second mode shift route only when the mode shift control section determines that the transitional drive force request of the driver cannot be satisfied by using the hybrid vehicle continuously variable transmission mode when the mode shift request is issued to shift from the electric vehicle continuously variable transmission mode to the hybrid vehicle fixed transmission mode.

9. The hybrid vehicle mode shift control device as recited in claim 3, wherein the differential gear device is arranged as a Ravigneaux planetary gear set configured and arranged such that when the drive force combining transmission is analyzed using a nomogram, the Ravigneaux planetary gear set is depicted as at least four input/output elements arranged in a row with first and second inner input/output elements lying between first and second outer input/output elements, an input from the engine being assigned to the first inner input/output elements, an output member delivering output to the drive system of the vehicle being assigned to the second inner input/output elements, a first motor generator being connected to the first outer input/output elements, and a second motor generator being connected to the second outer input/output elements, and the low brake is arranged as a frictional holding member configured and arranged to hold stationary a rotary member of the Ravigneaux type planetary gear set and positioned in the nomogram on the opposite side of the output member as the engine such that the output member is located between the engine and the low brake.

10. A mode shift control device for a hybrid vehicle comprising:

differential gear means for combining drive forces generated by an engine and at least one motor to deliver a drive force to a drive system of a vehicle;

engine clutch means for selectively connecting and disconnecting the engine with the differential gear means;

low brake means for holding a gear ratio of the differential gear means at a lower side gear ratio;

traveling mode controlling means for issuing a mode shift request for selectively shifting a traveling mode of the vehicle to one of a plurality of the traveling modes including at least an electric vehicle continuously variable transmission mode, an electric vehicle fixed transmission mode, a hybrid vehicle continuously variable transmission mode, and a hybrid vehicle fixed transmission mode; and mode shift control means for selecting one of a first mode shift route that passes through the hybrid vehicle continuously variable transmission mode and a second mode shift route that passes through the electric vehicle fixed transmission mode in accordance with a transitional drive force request of a driver when the mode shift request is issued to shift the traveling mode from the electric vehicle continuously variable transmission mode to the hybrid vehicle fixed transmission mode.

11. A method of controlling a hybrid vehicle comprising:

operating the hybrid vehicle in one of a plurality of traveling modes including at least an electric vehicle continuously variable transmission mode, an electric vehicle fixed transmission mode, a hybrid vehicle continuously variable transmission mode, and a hybrid vehicle fixed transmission mode; and selecting one of a first mode shift route that passes through the hybrid vehicle continuously variable transmission mode and a second mode shift route that passes through the electric vehicle fixed transmission mode in accordance with a transitional drive force request of a driver when the mode shift request is issued to shift the traveling mode from the electric vehicle continuously variable transmission mode to the hybrid vehicle fixed transmission mode.

* * * * *